(12) United States Patent
Davis et al.

(10) Patent No.: US 11,712,144 B2
(45) Date of Patent: *Aug. 1, 2023

(54) ROBOTIC DEVICE PERFORMING AUTONOMOUS SELF-SERVICE

(71) Applicant: QUALCOMM Incorporated, San Diego, CA (US)

(72) Inventors: Jonathan Paul Davis, Philadelphia, PA (US); Katie Cooper Davis, Philadelphia, PA (US); Michael Franco Taveira, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 17/067,529

(22) Filed: Oct. 9, 2020

(65) Prior Publication Data

US 2021/0113049 A1 Apr. 22, 2021

Related U.S. Application Data

(63) Continuation of application No. 15/976,671, filed on May 10, 2018, now Pat. No. 10,918,254.

(51) Int. Cl.
*A47L 11/40* (2006.01)
*G05D 1/00* (2006.01)
*G05D 1/02* (2020.01)

(52) U.S. Cl.
CPC ......... *A47L 11/4011* (2013.01); *A47L 11/403* (2013.01); *A47L 11/4061* (2013.01); *G05D 1/0088* (2013.01); *G05D 1/0225* (2013.01); *A47L 2201/024* (2013.01); *G05D 2201/0215* (2013.01)

(58) Field of Classification Search
CPC .. A47L 11/40; A47L 11/4011; A47L 11/4025; A47L 11/403; A47L 11/4061; A47L 9/2842; A47L 9/2857; A47L 2201/00; A47L 9/2889; A47L 9/2805; A47L 2201/024; G05D 1/0088; G05D 1/00; G05D 1/02; G05D 1/0225; G05D 1/021;
(Continued)

(56) References Cited

U.S. PATENT DOCUMENTS

| 10,918,254 B2 * | 2/2021 | Davis ................... G05D 1/0274 |
| 2004/0088816 A1 * | 5/2004 | Shimizu .................. A47L 11/34 15/327.2 |

(Continued)

*Primary Examiner* — Robert J Scruggs
(74) *Attorney, Agent, or Firm* — Holland & Hart LLP/Qualcomm

(57) ABSTRACT

Methods, systems, and devices for performing autonomous self-service are described. A robotic device may identify a status of a chamber associated with the robotic device based on sensor data received from a sensor of the robotic device and pause an autonomous debris collection process of the robotic device based on the identified status. The robotic device may automatically remove a first container from the chamber based on the identified status and discard the first container away from the robotic device. In some examples, the robotic device may discard the first container at a fixed position within a geo-boundary corresponding to the debris collection process. The robotic device may resume the autonomous debris collection process based on an introduction of a second container.

20 Claims, 9 Drawing Sheets

(58) Field of Classification Search
CPC ......... G05D 1/0274; G05D 2201/0215; A01D 34/008; A01D 34/0631
See application file for complete search history.

(56) References Cited

U.S. PATENT DOCUMENTS

| | | | |
|---|---|---|---|
| 2007/0050937 A1 | 3/2007 | Song et al. | |
| 2007/0245511 A1* | 10/2007 | Hahm | A47L 9/106 134/21 |
| 2008/0016646 A1* | 1/2008 | Gagnon | A47L 9/149 15/301 |
| 2008/0301899 A1* | 12/2008 | Blocker | A47L 9/2889 15/319 |
| 2009/0044370 A1* | 2/2009 | Won | A47L 11/4008 15/319 |
| 2014/0352102 A1* | 12/2014 | Schultink | A47L 9/1445 15/347 |
| 2016/0166126 A1* | 6/2016 | Morin | A47L 9/106 15/319 |
| 2016/0227975 A1* | 8/2016 | Ebrahimi Afrouzi | A47L 11/4011 |
| 2016/0374528 A1* | 12/2016 | Morin | A47L 9/2842 15/319 |
| 2017/0174092 A1 | 6/2017 | Kohnke | |
| 2018/0275668 A1* | 9/2018 | Diehr | B08B 3/02 |
| 2019/0343358 A1 | 11/2019 | Davis et al. | |

\* cited by examiner

ROBOTIC DEVICE PERFORMING AUTONOMOUS SELF-SERVICE

CROSS REFERENCE

The present application for Patent is a continuation of U.S. patent application Ser. No. 15/976,671 by DAVIS et al., entitled "A ROBOTIC DEVICE PERFORMING AUTONOMOUS SELF-SERVICE," filed May 10, 2018, assigned to the assignee hereof, and expressly incorporated herein.

BACKGROUND

The following relates generally to a robotic device, and more specifically to a robotic device performing autonomous self-service.

Robotic devices have become increasingly common for performing various tasks in a semi-autonomous or autonomous manner. Such robotic devices may be embodied in a variety of forms and used in a variety of applications, such as in automated vacuum cleaners, unmanned aerial vehicles, terrestrial vehicle, and the like. Applications for which robotic devices may be employed may include entertainment applications, utility applications in environments that are unfriendly to humans (e.g., space, deep water, cold temperature, radiation, chemical exposure, biohazards, etc.), dangerous applications (e.g., defusing of explosives), operation in confined spaces (e.g., collapsed buildings), or performing menial tasks (e.g., cleaning). Although, existing robotic devices operate in a semi-autonomous or autonomous manner when performing various tasks, servicing of these robotic devices requires personnel intervention. Improving techniques, methods, and related robotic devices for realizing autonomous servicing may be desirable.

SUMMARY

The described techniques relate to improved methods, systems, devices, and apparatuses that support performing autonomous self-service. A robotic device described herein may be configured with a mechanism to autonomously service itself. In some embodiments, the robotic device may be configured with a chamber to collect debris during an autonomous debris collection process. For the robotic device to autonomously service itself, it may identify a status of the chamber based on received sensor data. Based on the identified status, the robotic device may pause the autonomous debris collection process and automatically remove and discard a container from the chamber. After discarding the container, the robotic device may resume the autonomous debris collection process after introducing a new container into the chamber.

A method for performing autonomous self-service by a robotic device is described. The method may include identifying a status of a chamber associated with the robotic device based at least in part on sensor data received from a sensor of the robotic device, pausing an autonomous debris collection process of the robotic device based at least in part on the identified status, automatically removing a first container from the chamber based at least in part on the identified status, discarding the first container away from the robotic device, and resuming the autonomous debris collection process based at least in part on an introduction of a second container.

A robotic device for performing autonomous self-service is described. The robotic device may include a processor, a memory in electronic communication with the processor, a sensor in electronic communication with the processor and the memory, a chamber configured to collect debris, and instructions stored in the memory and executable by the processor to cause the robotic device to: identify a status of the chamber based at least in part on sensor data received from the sensor, pause an autonomous debris collection process of the robotic device based at least in part on the identified status, automatically remove a first container from the chamber based at least in part on the identified status, discard the first container away from the robotic device, and resume the autonomous debris collection process based at least in part on an introduction of a second container.

Another apparatus for performing autonomous self-service is described. The apparatus may include means for identifying a status of a chamber associated with the apparatus based at least in part on sensor data received from a sensor of the apparatus, pausing an autonomous debris collection process of the apparatus based at least in part on the identified status, automatically removing a first container from the chamber based at least in part on the identified status, discarding the first container away from the apparatus, and resuming the autonomous debris collection process based at least in part on an introduction of a second container.

A non-transitory computer-readable medium storing code that supports performing autonomous self-service at a robotic device is described. The code may include instructions executable by a processor to identify a status of a chamber based at least in part on sensor data received from a sensor, pause an autonomous debris collection process of the robotic device based at least in part on the identified status, automatically remove a first container from the chamber based at least in part on the identified status, discard the first container away from the robotic device, and resume the autonomous debris collection process based at least in part on an introduction of a second container.

Some examples of the method, robotic device, apparatus, and non-transitory computer-readable medium described herein for discarding the first container from the chamber may further include operations, features, means, or instructions for discarding the first container at a fixed position within a geo-boundary corresponding to the debris collection process.

Some examples of the method, robotic device, apparatus, and non-transitory computer-readable medium described herein may further include operations, features, means, or instructions for performing the autonomous debris collection process within a geo-boundary. Some examples of the method, robotic device, apparatus, and non-transitory computer-readable medium described herein for pausing the autonomous debris collection process may further include operations, features, means, or instructions for determining a position of the robotic device within the geo-boundary at a time of pausing the autonomous debris collection process, and recording the position based at least in part on determining the position within the geo-boundary.

Some examples of the method, robotic device, apparatus, and non-transitory computer-readable medium described herein for discarding the first container may further include operations, features, means, or instructions for analyzing a map associated with the geo-boundary, identifying a plurality of drop-off zones that are within a distance from the position of the robotic device based at least in part on analyzing the map, and selecting a drop-off zone that is within a minimum distance from the position of the robotic device based at least in part on comparing each distance associated with the plurality of drop-off zones, wherein the fixed position comprises the selected drop-off zone. In some examples of the method, robotic device, apparatus, and non-transitory computer-readable medium described herein, the plurality of drop-off zones are administrator defined or identified by the robotic device using occupancy data associated with the geo-boundary.

Some examples of the method, robotic device, apparatus, and non-transitory computer-readable medium described herein may further include operations, features, means, or instructions for determining a path from the position of the robotic device to the selected drop-off zone based at least in part the map, and navigating to the selected drop-off zone based at least in part on the determined path.

Some examples of the method, robotic device, apparatus, and non-transitory computer-readable medium described herein may further include operations, features, means, or instructions for discarding the first container from the chamber at the selected drop-off zone, inserting the second container within the chamber based at least in part on discarding the first container at the selected drop-off zone, and navigating to the recorded position based at least in part on inserting the second container. In some examples of the method, robotic device, apparatus, and non-transitory computer-readable medium described herein, resuming the autonomous debris collection process may be after the robotic device arrives at the recorded position.

Some examples of the method, robotic device, apparatus, and non-transitory computer-readable medium described herein for discarding the first container from the chamber at the selected drop-off zone may further include operations, features, means, or instructions for discarding the first container from the chamber at a location adjacent to an access point of the selected drop-off zone.

Some examples of the method, robotic device, apparatus, and non-transitory computer-readable medium described herein may further include operations, features, means, or instructions for generating a notification indicating that the first container has been discarded at the selected drop-off zone, and transmitting the notification to a wireless device of an administrator associated with the robotic device.

Some examples of the method, robotic device, apparatus, and non-transitory computer-readable medium described herein for identifying the status of the chamber may further include operations, features, means, or instructions for obtaining sensor measurements from the sensor and determining a weight of the chamber based at least in part on the sensor measurements. In some examples of the method, robotic device, apparatus, and non-transitory computer-readable medium described herein, the status of the chamber is further based at least in part on the weight of the chamber.

Some examples of the method, robotic device, apparatus, and non-transitory computer-readable medium described herein for identifying the status of the chamber may further include operations, features, means, or instructions for obtaining sensor measurements from the sensor and determining whether an airflow pressure associated with the autonomous debris collection process is below a threshold based at least in part on the sensor measurements. In some examples of the method, robotic device, apparatus, and non-transitory computer-readable medium described herein, the status of the chamber is further based at least in part on the airflow pressure.

Some examples of the method, robotic device, apparatus, and non-transitory computer-readable medium described herein for removing the first container from the chamber may further include operations, features, means, or instructions for sealing a portion of the first container.

DETAILED DESCRIPTION

Figure 1:
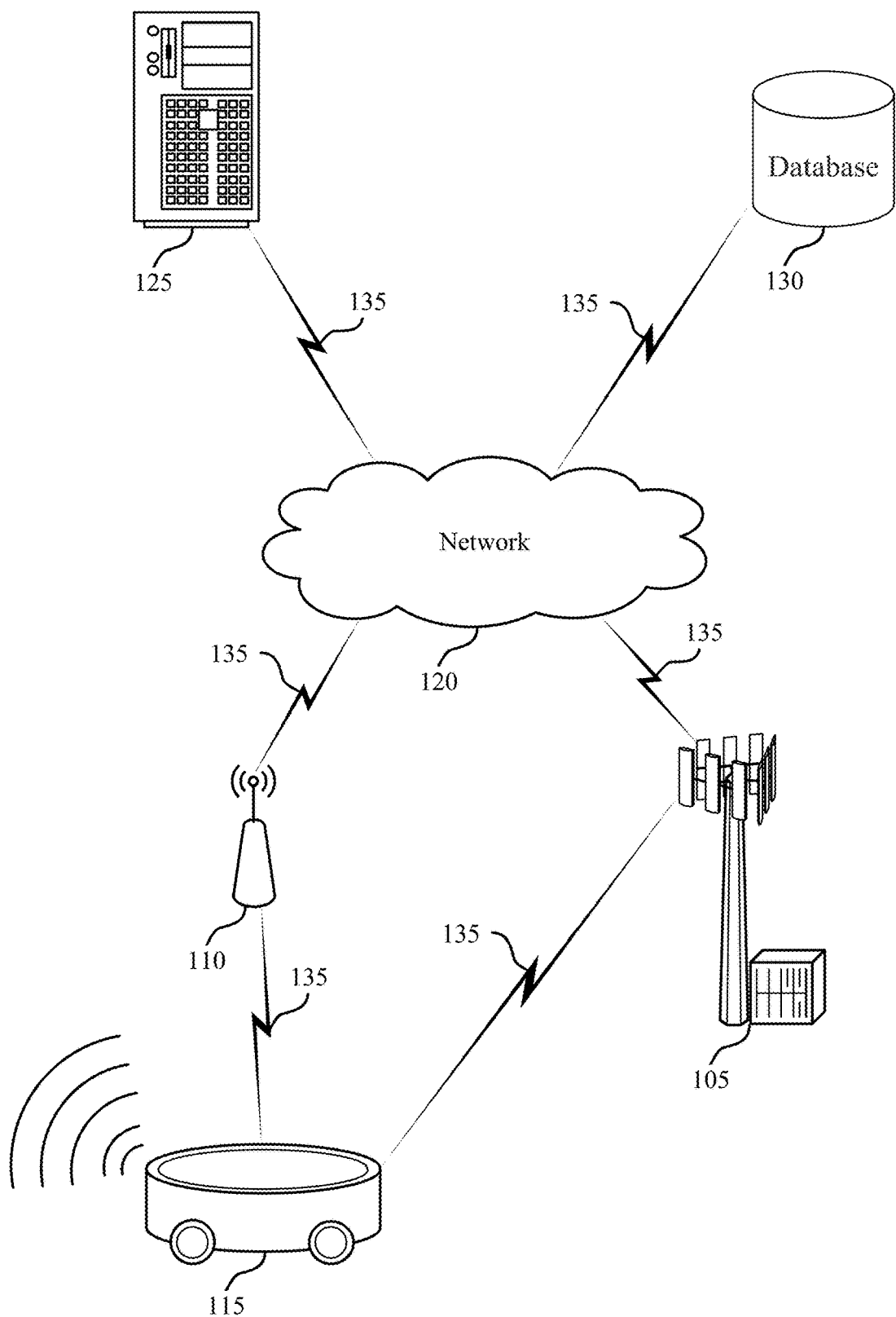
FIG. 1 illustrates an example of a system that supports a robotic device performing autonomous self-service in accordance with aspects of the present disclosure.

Some robotic devices have been embodied in a variety of forms and used in a variety of applications. Although, some robotic devices operate in a semi-autonomous or autonomous manner when performing various functions, servicing of these devices may involve personnel involvement. For example, when a robotic device functioning as a vacuum collects debris, the device stores the contents within an internal chamber. This chamber may then be emptied by a personnel. However, if the chamber becomes full during operation, the device may discontinue its operation and await servicing. As a result, the device may provide a limited service (e.g., amount of area covered) before it has to pause operation and be serviced.

A robotic device described herein may be configured with a mechanism to autonomously service itself. The term "autonomously service" may be used herein to describe a maintenance performed by a robotic device. In the example of a robotic device functioning as a vacuum, the device may be configured with a system that recognizes when a chamber becomes full. Some examples of recognizing whether the chamber is full may be based on weight, or some other sensor information. After the device determines that the chamber is full, the device may pause operation and record its position. The autonomous service aspect may include the robotic device emptying contents within a container positioned within the chamber or discarding the container and replacing it with a new container.

In some implementations, the robotic device may employ various mechanisms and algorithms for determining a path within its environment to travel to a designated area and dispose the contents or the container at the area. The designated area may be user-defined and/or identified by the robotic device using occupancy data related to an area where the robotic device performs the function, for example, debris collection. After disposing the contents or the container, the device may return to the recorded position and resume its operation. Alternatively, the device may dispose the contents or the container at the position where it determines that the chamber is full and reloads it with the new container. Thereby, reducing the duration of having to pause the operation. The robotic device may also be capable of generating and transmitting a notification message indicating a location of the disposed bag, such that an individual may attend to the disposed bag appropriately. By realizing autonomous servicing of a robotic device (e.g., emptying contents within a container positioned within the chamber or discarding the container and replacing it with a new container), latency of awaiting to be serviced by a personnel may be eliminated.

Aspects of the disclosure are initially described in the context of a system. Aspects of the disclosure are further illustrated by and described in the context of an environment that relates to a robotic device performing autonomous self-service. Aspects of the disclosure are further illustrated by and described with reference to apparatus diagrams, system diagrams, and flowcharts that relate to a robotic device performing autonomous self-service.

FIG. 1 illustrates an example of a system 100 that supports a robotic device 115 performing autonomous self-service in accordance with aspects of the present disclosure. The term "robotic device" may be used herein to describe one of various types of robotic vehicles, robotic appliances, robots, etc. including an onboard processing device configured to provide some autonomous or semi-autonomous capabilities. Examples of robotic devices include: aerial vehicles, such as an unmanned aerial vehicle (UAV); ground vehicles and robots (e.g., autonomous or semi-autonomous cars, vacuum robots, search and rescue robots, bomb detection and disarming robots, etc.); water-based vehicles (i.e., surface watercraft and submarines); space-based vehicles (e.g., a spacecraft or space probe); and/or some combination thereof. In some embodiments, the robotic device 115 may be manned. In other embodiments, the robotic device 115 may be unmanned.

In embodiments in which the robotic device 115 is autonomous, the robotic device 115 may include an onboard processing device configured to maneuver and/or navigate the robotic device 115 without remote operating instructions (i.e., autonomously), such as from a human operator (e.g., via a remote computing device). In embodiments in which the robotic device 115 is semi-autonomous, the robotic device 115 may include an onboard processing device configured to receive some information or instructions, such as from a human operator (e.g., via a remote computing device), and autonomously maneuver and/or navigate the robotic device 115 consistent with the received information or instructions. Various embodiments may be particularly useful for robotic devices configured to perform household tasks (e.g., vacuuming, lawn mowing) while operating interior to or exterior to structures.

The term "position" may be used herein to describe a location and an orientation of the robotic device 115 within a geo-boundary. In an embodiment in which the robotic device 115 navigates in two-dimensions (2D), such as along the surface of a floor, the position of the robotic device 115 may be specified by a 2D position (x,y) and a heading (θ). In some embodiments, the robotic device 115 may employ simultaneous localization and mapping (SLAM) techniques to construct and update a map of an environment and geo-boundary associated with the environment, while simultaneously keeping track of its position within the environment and relative to the geo-boundary. A geo-boundary may correspond to a premises and define a 2D or 3D spatial boundary associated with the environment. For example, an environment may be a premises including a home, the geo-boundary may correspond to certain zones (e.g., rooms) of the home that the robotic device 115 is allowed to perform autonomous functions, while other zones may be restricted (e.g., rooms where the robotic device 115 is not allowed to perform autonomous functions).

The system 100 may support the robotic device 115 with a mechanism to autonomously service itself. In some embodiments, the robotic device 115 may be configured to perform an autonomous debris collection process. For example, the robotic device 115 may act as a vacuum. The robotic device 115 may be configured to recognize when a chamber holding the debris becomes full. Some examples of recognizing whether the chamber is full may be based on sensor information. After the robotic device 115 determines that the chamber is full, it may pause operation and record its position. The chamber may also be configured with a disposable bag system that closes and seals a full bag, and reloads the chamber with a new empty bag.

In some implementations, the robotic device 115 may employ various mechanisms and algorithms for determining a path within a geo-boundary to navigate to a designated area (e.g., drop-off zone) and dispose the bag at the area. The designated area may be user-defined and/or identified by the robotic device using occupancy data related to the environment. After disposing the bag, the robotic device 115 may return to the recorded position and resume its operation. Alternatively, the robotic device 115 may dispose the bag at the position where it determines that the chamber is full and reloads it with the new empty bag. Thereby, reducing the duration of having to pause the operation. The robotic device 115 may also be capable of generating and transmitting a notification message indicating a location of the disposed bag, such that an individual may attend to the disposed bag appropriately. By realizing autonomous servicing of a robotic device, latency due to the personnel intervention factor may be eliminated.

The system 100 may also include a base station 105, an access point 110, a server 125, and a database 130. The server 125 may include any combination of a data server, a cloud server, a server associated with an automation service provider, proxy server, mail server, web server, application server, database server, communications server, home server, mobile server, or any combination thereof. For example, the robotic device 115 may upload data (e.g., notifications) to an application hosted by the server 125 for posting data related to autonomous functions performed by the robotic device 115. For example, a user may be able to view the data posted by the robotic device 115 via an application running on a personnel wireless device to review functions performed by the device 115. The server 125 may also transmit to the robotic device 115 a variety of information, such as navigation information, movement control instructions, and other information, instructions, or commands relevant to autonomous operations of the robotic device 115.

The database 130 may store data that may include navigation information, movement control instructions, and other information, instructions, or commands (e.g., drop-off zones, occupancy data, administrator preferences (e.g., designated drop-off zones by a user, restricted zones) relevant to autonomous operations of the robotic device 115. The robotic device 115 may retrieve the stored data from the database via the base station 105 and/or the access point 110.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)) for example), etc. Network 120 may include the Internet.

The base station 105 may wirelessly communicate with the robotic device 115 via one or more base station antennas. Base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The robotic device 115 described herein may be able to communicate with various types of base stations and network equipment including macro eNBs, small cell eNBs, gNBs, relay base stations, and the like. The access point 110 may be configured to provide wireless communications for the robotic device 115 over a relatively smaller area compared to the base station 105.

In some cases, the robotic device 115 may also be able to communicate directly with another device (e.g., using a peer-to-peer (P2P) or device-to-device (D2D) protocol) such as: a user equipment (UE), a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The wireless communication links 135 shown in the system 100 may include uplink (UL) transmissions from the robotic device 115 to the base station 105, the access point 110, or the server 125, and/or downlink (DL) transmissions, from the base station 105, the access point 110, or the server 125 to the robotic device 115. The downlink transmissions may also be called forward link transmissions while the uplink transmissions may also be called reverse link transmissions. The wireless communication links 135 may transmit bidirectional communications and/or unidirectional communications. Wireless communication links 135 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to wireless communication systems.

Figure 2A:
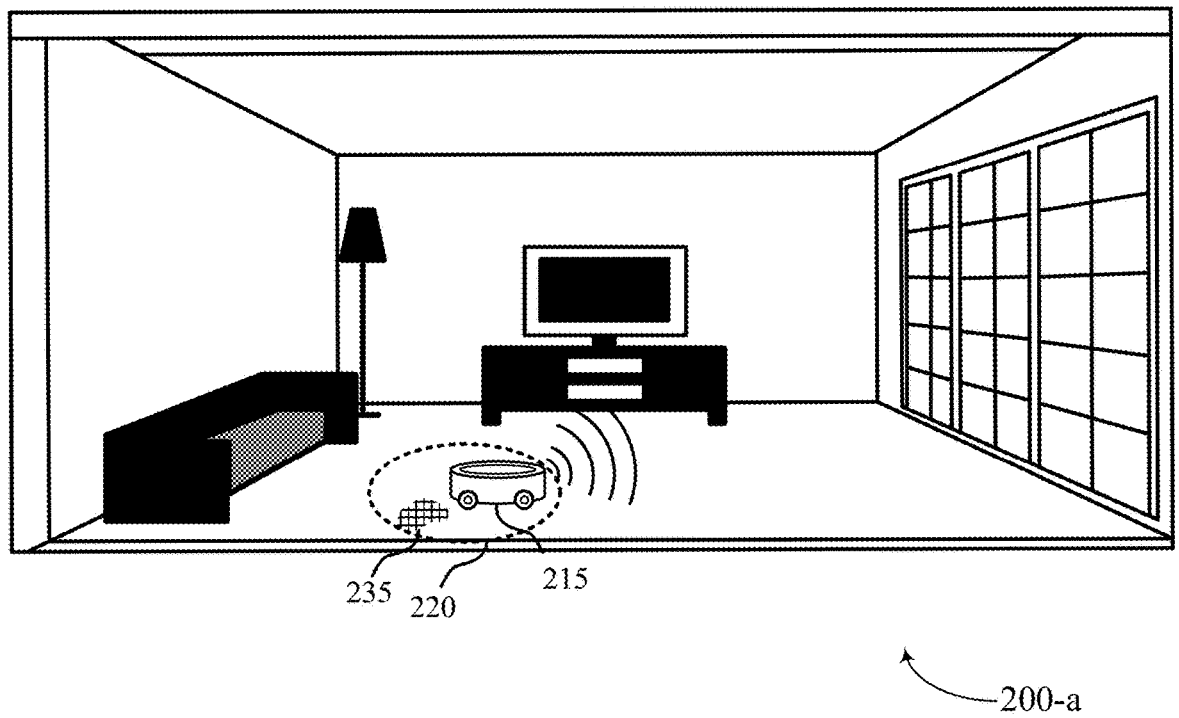
FIGS. 2A and 2B and 3A and 3B illustrate example of an environment that support a robotic device performing autonomous self-service in accordance with aspects of the present disclosure.
Figure 2B:
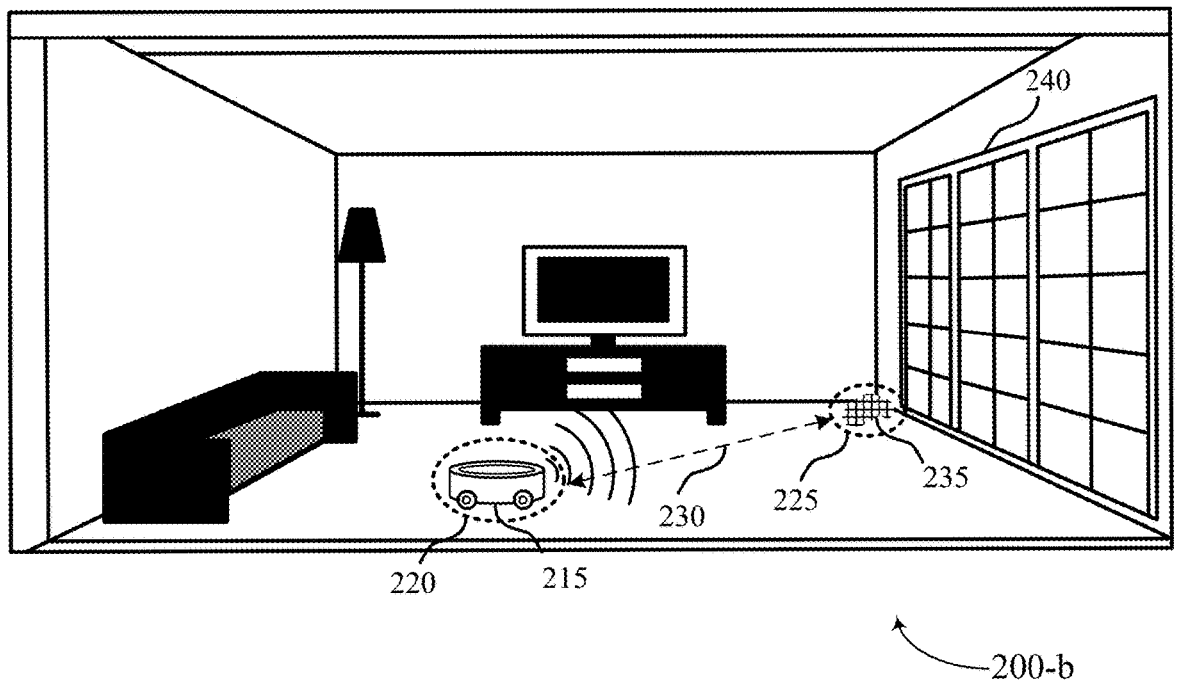

FIGS. 2A and 2B illustrates an example of an environment 200 that supports a robotic device 215 performing autonomous self-service in accordance with aspects of the present disclosure. The environment 200 may implement aspects of the system 100. The robotic device 215 may be configured with a mechanism for autonomous servicing. In some examples, the robotic device 215 may be an example of aspects of a device described herein.

The robotic device 215 may be configured with mapping techniques allowing it to construct a map of its surroundings (e.g., the environment 200). In addition, the robotic device 215 may be configured to localize itself within the map, and thereby support a degree of autonomy when performing functions within the environment 200. In some embodiments, the robotic device 215 may identify a geo-boundary corresponding to the environment 200.

The environment 200 may be, in some examples, part of a structure, such as a residential or commercial building. For example, the environment 200 may be a home and in particular, may be a room (e.g., bedroom, living room) including one or more access points (e.g., windows and/or doors) and objects (e.g., furniture, electronic devices) spread throughout the room. The geo-boundary may relate to the environment 200 and the robotic device 215 may be configured to perform autonomous functions within the geo-boundary. For example, the robotic device 215 may perform within the geo-boundary an autonomous debris collection process, which includes the robotic device 215 collecting and storing the debris in an internal chamber. Typically, in conventional environments, the robotic device 215 may suspend the debris collection process and await for a personnel to empty or replace the chamber. As a result, the human intervention aspect introduces limitations on an amount of area that the robotic device 215 may cover in the environment 200 and presents an undesirable delay before the robotic device 215 can resume the debris collection process. According to the described techniques herein, the robotic device 215 may be configured with a mechanism for autonomous servicing. Thereby, eliminating the limitations and delay related to the human intervention aspect.

The robotic device 215 may periodically or continuously identify, during an autonomous debris collection process, a status of a chamber based on sensor data received from one or more sensors of the robotic device 215. The status may provide a level of indication related to a capacity (e.g., fullness) of the chamber. In some examples, the robotic device 215 may obtain sensor measurements from the sensor to identify the status of the chamber. For example, a weight sensor may sense and record weight measurements of the chamber. In another example, an airflow sensor of the robotic device 215 may sense and record airflow pressure measurements related to the autonomous debris collection process. Additionally, or alternatively, a camera sensor may capture an image within the chamber and determine a volume of debris within the chamber. As such, the robotic device 215 may obtain one or a variety of different measurements and determine whether the measurements satisfy a threshold (e.g., a weight threshold, an airflow threshold, a volume threshold). If the threshold is satisfied, the robotic device 215 may pause the autonomous debris collection process.

With reference to FIG. 2A, the robotic device 215 may automatically remove a container from the chamber and discard the container away from the robotic device 215 based on the identified status of the chamber and/or pausing the autonomous debris collection process. For example, the robotic device 215 may discard container 235 at a fixed position 220 related to the where the robotic device 215 identified the status of the chamber and also paused the autonomous debris collection process. The container 235 may be a bag, a receptacle, a bin, and the like. By discarding the container 235 away from the robotic device 215, at the position 220 where the status of the chamber was identified to satisfy a threshold, a latency related to navigating to a designated area may be mitigated. In some embodiments, the container 235 may be part of the chamber and discarding the container 235 may refer to the robotic device 215 emptying debris within the container 235 at the fixed position 220 without discarding the container 235.

In some examples, the robotic device 215 may determine and verify whether the position 220 is an acceptable position for discarding the container 235. To determine whether the position 220 is an acceptable positions, the robotic device 215 may compare the position 220 to a list of unacceptable positions in the environment 200. An unacceptable position may be a position in environment 200 selected by an administrator or a position that may be accessible to minors or pets, or. For example, a parent may want to avoid having their child consume the debris, or having their pet play in it. If the position 220 does not match any of the unacceptable positions, the robotic device 215 may discard the container 235 at the position 220. Otherwise, the robotic device 215 may navigate to an acceptable position.

With reference to FIG. 2B, the robotic device 215 may determine and record the position 220 within the geo-boundary of the environment 200-b, after pausing the autonomous debris collection process. For example, the robotic device 215 may determine a position 220 within the geo-boundary of the environment 200-b at a time of pausing the autonomous debris collection process. Additionally, or alternatively, the robotic device 215 may determine and record the position 220 based on determining that the position 220 is an unacceptable position for discarding the container 235. By recording the position 220, the robotic device 215 may be capable of returning to the recorded position to resume the autonomous debris collection process at a later time.

The robotic device 215 may analyze a map associated with the geo-boundary of the environment 200-b, and identify a plurality of drop-off zones that are within a distance from the position 220 based on the analysis. In some examples, the drop-off zones may be administrator defined or identified by the robotic device 215 using occupancy data collected by a sensor of the robotic device 215, or one or more sensors (e.g., motion sensors, sound sensors, camera sensors) of the environment 200-b. The robotic device 215 may select a drop-off zone 225 that is within a minimum distance from the position 220 based on comparing each distance associated with the plurality of drop-off zones. Additionally, the robotic device 215 may select the drop-off zone 225 because it has a certain occupancy level associated with it based on comparing occupancy levels associated with each of the plurality of drop-off zones. That is, it may be desirable to discard the container at position that has high traffic associated with it and would result in a higher probability of someone attending to the discarded container compared to discarding it at a position where it may go unattended for some time. For example, the selected drop-off zone 225 may be adjacent to an access point 240 having high traffic (e.g., people using the access point 240). In some examples, the selected drop-off zone 225 may be a fixed position. A fixed position may be a position in environment 200 where the robotic device 215 is programmed to discard debris within a container or the container itself.

The robotic device 215 may determine a path 230 from the position 220 to the selected drop-off zone 225 including determining an orientation, heading, speed and similar information for navigation purposes to the selected drop-off zone 225. For example, the robotic device 215 may navigate to the selected drop-off zone 225 using the determined path 230. Once the robotic device 215 has reached the selected drop-off zone 225, it may discard the container 235 from the chamber and insert a new container within the chamber. In some embodiments, automatically removing and/or discarding the container 235 may include sealing a portion of the container 235. For example, the robotic device 215 may be configured with a mechanism that closes and seals a bag. In addition, the robotic device 215 may be configured with a mechanism that has cartridge of bags, it would then pull another disposable bag from the cartridge and set it up to receive debris. Alternatively, the container 235 may be part of the chamber and discarding the container 235 at the selected drop-off zone 225 may refer to the robotic device 215 emptying debris within the container 235 at the selected drop-off zone 225 without discarding the container 235.

Once the robotic device 215 has discarded the container 235 or contents within the container 235 at the selected drop-off zone 225, the robotic device 215 may navigate to the recorded position 220 such that the robotic device 215 may resume the autonomous debris collection process at the paused position. For example, the robotic device 215 may navigate to the recorded position 220 using the previous determined path 230 or determine a new path different from the path 230. Additionally, or alternatively, the robotic device 215 may generate and transmit a notification indicating that the container 235 has been discarded at the selected drop-off zone 225. For example, the robotic device 215 may capture an image of the discarded container 235 at the selected drop-off zone 225 and transmit it to a device of an administrator associated with the robotic device 215. In the example, of the environment 200, the administrator may be a home owner, renter, occupant, and the like. By realizing autonomous servicing, the robotic device 215 may eliminate having to pause its autonomous operation, as well as remove its dependency on having to be serviced by a personnel.

FIG. 3 illustrates an example of an environment 300 that supports a robotic device performing autonomous self-service in accordance with aspects of the present disclosure. In some examples, the environment 300 may implement aspects of the system 100 and/or the environment 200. The robotic device 315 may be configured with a mechanism for autonomous servicing. In some examples, the robotic device 315 may be an example of aspects of a device described herein. The robotic device 315 may be configured with mapping techniques allowing it to construct a map of its surroundings (e.g., the environment 300) as described herein. The robotic device 315 may identify a geo-boundary corresponding to the environment 300.

The environment 300 may be, in some examples, part of a premises, such as a residential or commercial building. For example, the environment 300 may be a home and a geo-boundary may correspond to a lawn 305. The robotic device 315 may be configured to perform autonomous functions such mowing the lawn 305 within the geo-boundary. The robotic device 315 may mow and store grass clippings in an internal chamber. Typically, in conventional environments, the robotic device 315 may suspend an autonomous lawn mowing process and await for a personnel to empty or replace the chamber. As a result, the human intervention aspect introduces limitations on an amount of lawn 305 that the robotic device 315 may cover and presents an undesirable delay before the robotic device 315 can resume mowing the lawn 305. According to the described techniques herein, the robotic device 315 may be configured with a mechanism for autonomous servicing. Thereby, eliminating the limitations and delay related to the human intervention aspect.

The robotic device 315 may periodically or continuously identify, during the autonomous lawn mowing process, a status of a chamber based on sensor data received from one or more sensors of the robotic device 315, as described herein. The status may provide a level of indication related to a capacity (e.g., fullness) of the chamber. In some examples, the robotic device 315 may obtain sensor measurements from the sensor to identify the status of the chamber. The robotic device 315 may obtain one or a variety of different measurements and determine whether the measurements satisfy a threshold (e.g., a weight threshold, a volume threshold). If the threshold is satisfied, the robotic device 315 may pause the autonomous lawn mowing process.

Figure 3A:
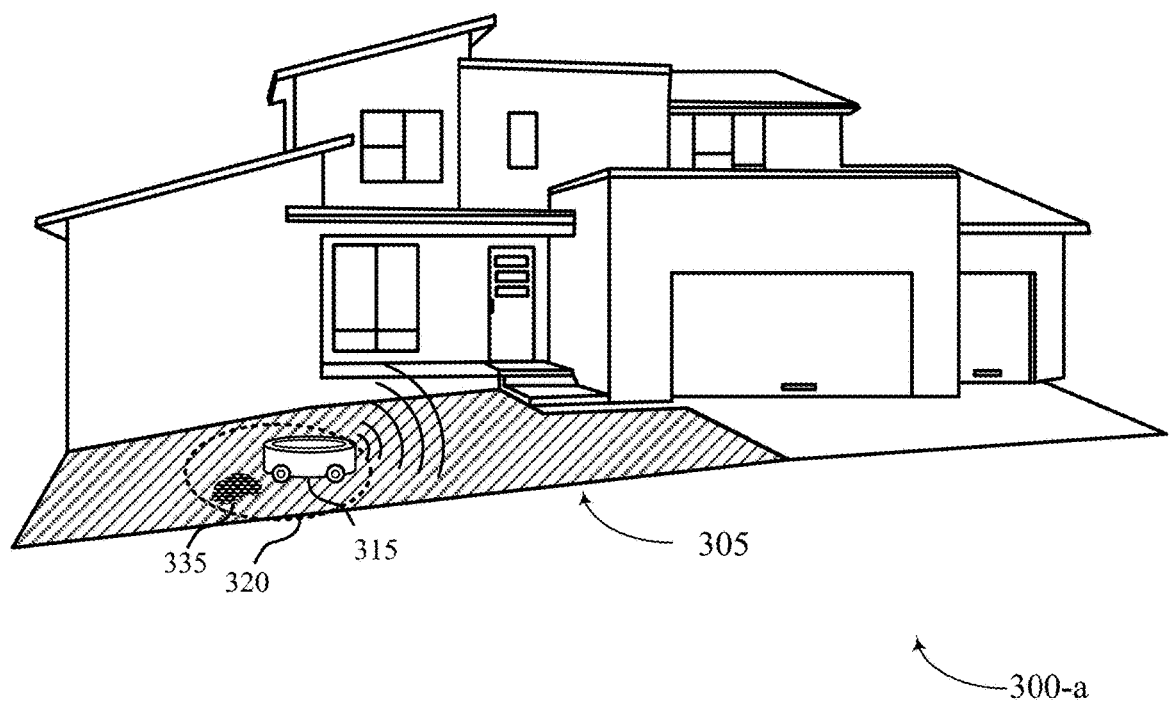

The robotic device 315 may, with reference to FIG. 3A, automatically remove a container from the chamber and discard the container away from the robotic device 315 based on the identified status of the chamber and/or pausing the autonomous debris collection process as described herein. For example, the robotic device 315 may discard container 335 at a fixed position 320 related to the where the robotic device 315 identified the status of the chamber and also paused the autonomous lawn mowing process. In some embodiments, the container 335 may be part of the chamber and discarding the container 335 may refer to the robotic device 315 emptying grass clippings within the container 335 at the fixed position 320 without discarding the container 335. In some examples, the robotic device 315 may determine whether the position 320 is an acceptable position for discarding the container 335, as described herein. If the position 320 is determined to be an acceptable position, the robotic device 315 may discard the container 335 at the position 320. Otherwise, the robotic device 315 may navigate to an acceptable position.

Figure 3B:
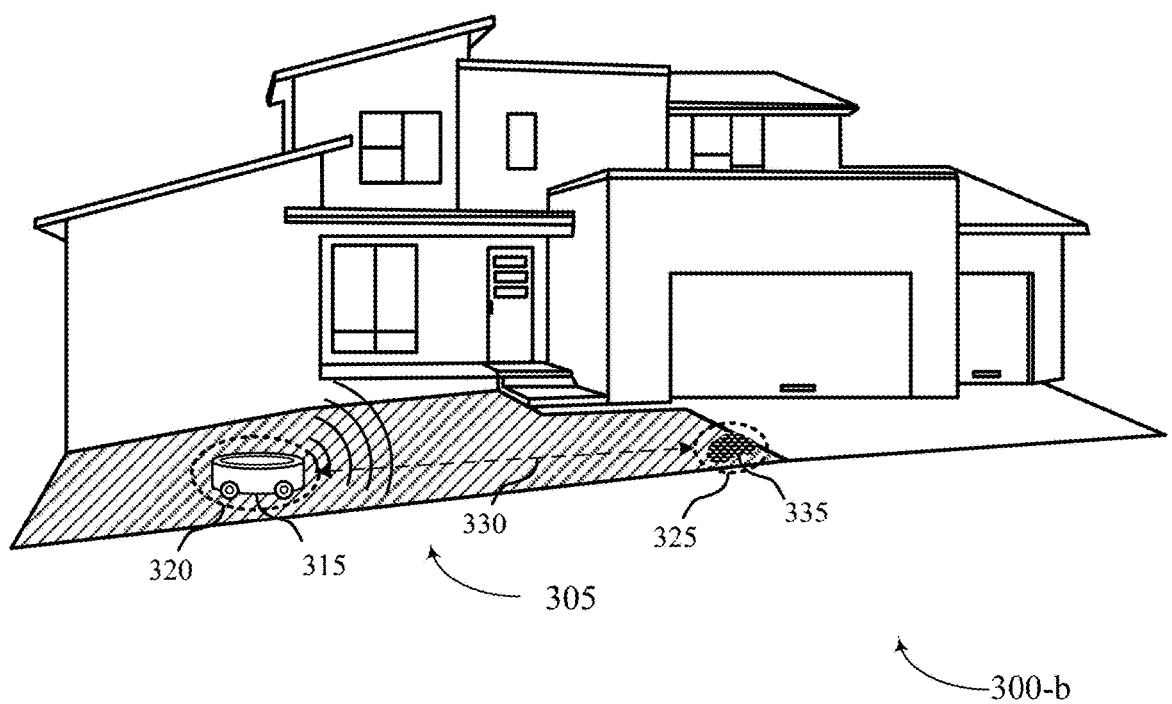

With reference to FIG. 3B, the robotic device 315 may determine and record a position 320 within the geo-boundary of the lawn 305, after pausing the autonomous lawn mowing process. For example, the robotic device 315 may determine a position 320 within the lawn 305 at a time of pausing the autonomous lawn mowing process. Additionally, or alternatively, the robotic device 315 may determine and record the position 320 based on determining that the position 320 is an unacceptable position for discarding the container 335. By recording the position 320, the robotic device 315 may be capable of returning to the recorded position to resume the autonomous lawn mowing process.

The robotic device 315 may analyze a map associated with the lawn 305, and identify a plurality of drop-off zones that are within a distance from the position 320 based on the analysis. The robotic device 315 may select a drop-off zone 325 based on one or more techniques as described herein. The robotic device 315 may determine a path 330 from the position 320 to the selected drop-off zone 325 including determining an orientation, heading, speed and similar information for navigation purposes to the selected drop-off zone 325, as described herein. For example, the robotic device 315 may navigate to the selected drop-off zone 325 using the determined path 330. Once the robotic device 315 has reached the selected drop-off zone 325, it may discard the container 335 from the chamber and insert a new container within the chamber. In some embodiments, automatically removing and/or discarding the container 335 may include sealing a portion of the container 335. Alternatively, the container 335 may be part of the chamber and discarding the container 335 at the selected drop-off zone 325 may refer to the robotic device 315 emptying grass clippings within the container 335 at the selected drop-off zone 325 without discarding the container 335.

The robotic device 315 may navigate to the recorded position 320 to resume the autonomous lawn mowing process at the paused position based on discarding the grass clippings or the container 335 at the selected drop-off zone 325. For example, the robotic device 315 may navigate to the recorded position 320 using the previous determined path 330 or determine a new path different from the path 330. Additionally, or alternatively, the robotic device 315 may generate and transmit a notification as described herein. By realizing autonomous servicing, the robotic device 315 may eliminate having to pause its autonomous operation, as well as remove its dependency on having to be serviced by a personnel.

Figure 4:
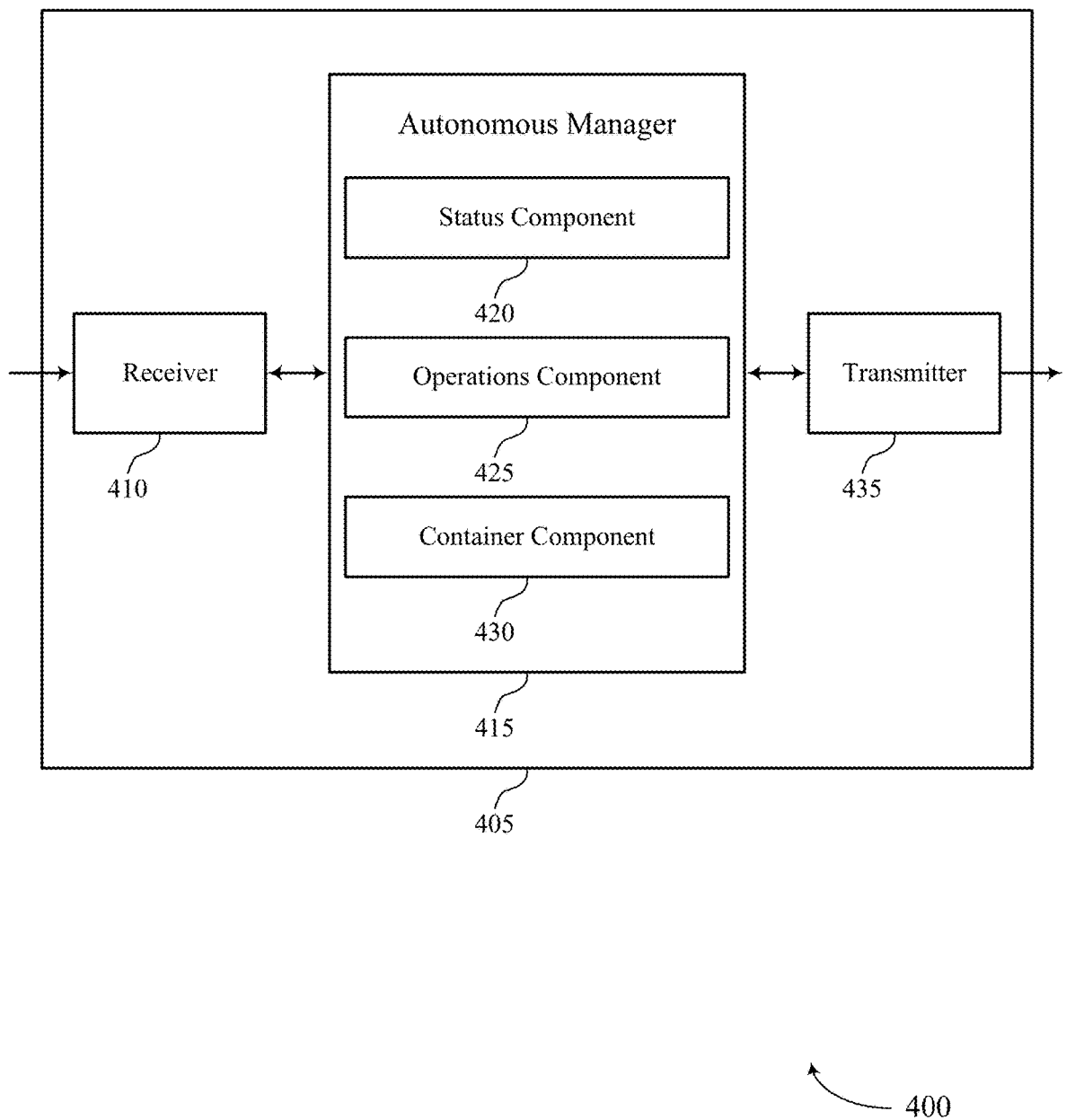
FIGS. 4 and 5 show block diagrams of a robotic device that supports performing autonomous self-service in accordance with aspects of the present disclosure.

FIG. 4 shows a block diagram 400 of a robotic device 405 that supports performing autonomous self-service in accordance with aspects of the present disclosure. The robotic device 405 may be an example of aspects of a robotic device as described with reference to FIGS. 1 to 3. The robotic device 405 may include a receiver 410, an autonomous manager 415, and a transmitter 435. The device 405 may also include a processor. Each of these components may be in communication with one another (e.g., via one or more buses).

The receiver 410 may receive information such as packets, user data, or control information associated with various information channels (e.g., control channels, data channels, and information related to autonomous self-service, etc.). Information may be passed on to other components of the robotic device 405. The receiver 410 may be an example of aspects of the transceiver 620 described with reference to FIG. 6. The receiver 410 may utilize a single antenna or a set of antennas.

The autonomous manager 415 may identify a status of a chamber associated with the robotic device 405 based on sensor data received from a sensor of the robotic device 405, pause an autonomous debris collection process of the robotic device 405 based on the identified status, resume the autonomous debris collection process based on an introduction of a second container, automatically remove a first container from the chamber based on the identified status, and discard the first container away from the robotic device 405.

The autonomous manager 415, or its sub-components, may be implemented in hardware, code (e.g., software or firmware) executed by a processor, or any combination thereof. If implemented in code executed by a processor, the functions of the autonomous manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The autonomous manager 415, or its sub-components, may be physically located at various positions, including being distributed such that portions of functions are implemented at different physical locations by one or more physical components. In some examples, the autonomous manager 415, or its sub-components, may be a separate and distinct component in accordance with various aspects of the present disclosure. In some examples, the autonomous manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The autonomous manager 415 may include a status component 420, an operations component 425, and a container component 430. The status component 420 may identify a status of a chamber associated with the robotic device 405 based on sensor data received from a sensor of the robotic device 405. The operations component 425 may pause an autonomous debris collection process of the robotic device 405 based on the identified status and resume the autonomous debris collection process based on an introduction of a second container. The container component 430 may automatically remove a first container from the chamber based on the identified status and discard the first container away from the robotic device 405.

The transmitter 435 may transmit signals generated by other components of the robotic device 405. In some examples, the transmitter 435 may be collocated with a receiver 410 in a transceiver module. For example, the transmitter 435 may be an example of aspects of the transceiver 620 described with reference to FIG. 6. The transmitter 435 may utilize a single antenna or a set of antennas.

Figure 5:
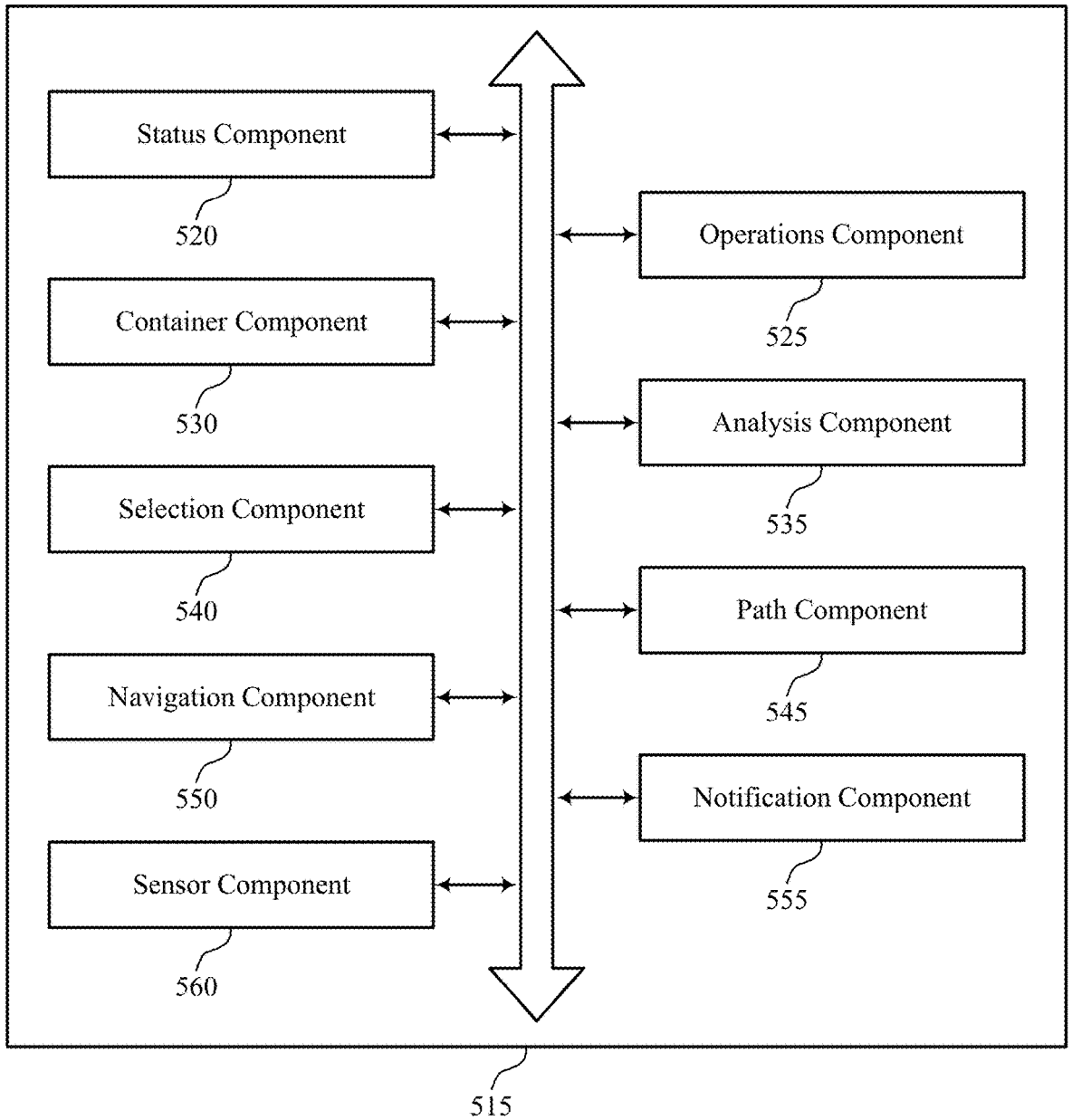

FIG. 5 shows a block diagram 500 of a robotic device including an autonomous manager 515 that supports performing autonomous self-service in accordance with aspects of the present disclosure. The autonomous manager 515 may be an example of aspects of an autonomous manager 415 or an autonomous manager 610 described herein. The autonomous manager 515 may include a status component 520, an operations component 525, a container component 530, an analysis component 535, a selection component 540, a path component 545, a navigation component 550, a notification component 555, and a sensor component 560. Each of these modules may communicate, directly or indirectly, with one another (e.g., via one or more buses).

The status component 520 may identify a status of a chamber associated with the robotic device based on sensor data received from a sensor of the robotic device. The operations component 525 may pause an autonomous debris collection process of the robotic device based on the identified status. In some examples, the operations component 525 may resume the autonomous debris collection process based on an introduction of a second container. In some examples, the operations component 525 may perform the autonomous debris collection process within a geo-boundary.

The container component 530 may automatically remove a first container from the chamber based on the identified status. In some examples, the container component 530 may discard the first container away from the robotic device. In some examples, the container component 530 may discard the first container at a fixed position within the geo-boundary corresponding to the debris collection process. In some examples, the container component 530 may seal a portion of the first container.

The container component 530 may discard the first container from the chamber at ae selected drop-off zone. In some examples, the container component 530 may insert the second container within the chamber based on discarding the first container at the selected drop-off zone. In some examples, the container component 530 may discard the first container from the chamber at a location adjacent to an access point of the selected drop-off zone.

The analysis component 535 may analyze a map associated with the geo-boundary. In some examples, the analysis component 535 may identify a set of drop-off zones that are within a distance from the position of the robotic device based on analyzing the map. In some examples, the set of drop-off zones may be administrator defined or identified by the robotic device using occupancy data associated with the geo-boundary.

The selection component 540 may select a drop-off zone that is within a minimum distance from the position of the robotic device based on comparing each distance associated with the set of drop-off zones. In some examples, the fixed position includes the selected drop-off zone.

The path component 545 may determine a path from the position of the robotic device to the selected drop-off zone based at least in part the map. The navigation component 550 may navigate to the selected drop-off zone based on the determined path. In some examples, the navigation component 550 may navigate to the recorded position based on inserting the second container, where resuming the autonomous debris collection process may be after the robotic device arrives at the recorded position. In some examples, the robotic device may continue the autonomous debris collection process from the selected drop-off zone after discarding the first container at the selected drop-off zone.

The notification component 555 may generate a notification indicating that the first container has been discarded at the selected drop-off zone. In some examples, the notification component 555 may transmit the notification to a wireless device of an administrator associated with the robotic device.

The sensor component 560 may obtain sensor measurements from the sensor. In some examples, the sensor component 560 may determine a weight of the chamber based on the sensor measurements, where the status of the chamber is further based on the weight of the chamber. In some examples, the sensor component 560 may determine whether an airflow pressure associated with the autonomous debris collection process is below a threshold based on the sensor measurements, where the status of the chamber is further based on the airflow pressure.

Figure 6:
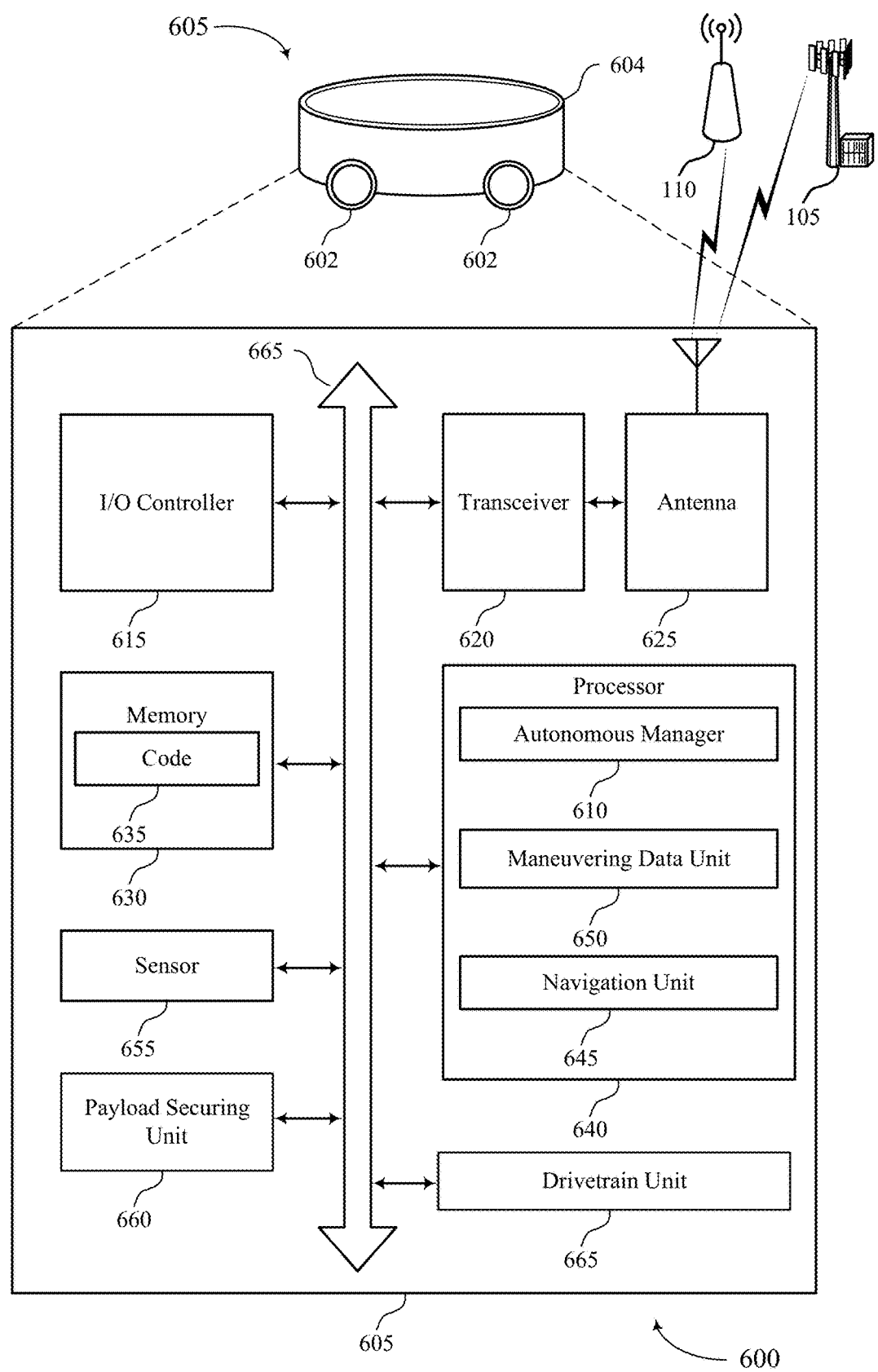
FIG. 6 shows a diagram of a system including a robotic device that supports performing autonomous self-service in accordance with aspects of the present disclosure.

FIG. 6 shows a diagram of a system 600 including a robotic device 605 that supports performing autonomous self-service in accordance with aspects of the present disclosure. The robotic device 605 may be an example of or include the components of robotic device 405, robotic device 505, or a device as described herein. The robotic device 605 may include components for bi-directional voice and data communications including components for transmitting and receiving communications, including an I/O controller 615, a transceiver 620, an antenna 625, memory 630, a processor 640, a sensor 655, and a payload securing unit 660. These components may be in electronic communication via one or more buses (e.g., bus 665).

The robotic device 605 may be a ground-based robotic device that may include a number of wheels 602 operated by corresponding motors to provide locomotion and a frame 604. The frame 604 may provide structural support for internal components (e.g., the I/O controller 615, the transceiver 620, the antenna 625, the memory 630, the processor 640, the sensor 655, and the payload securing unit 660) of the robotic device 605 as well as for the wheels 602. The robotic device 605 illustrated in FIG. 6 is an example of a robotic vehicle that may utilize various embodiments, but is not intended to imply or require that various embodiments are limited to ground robotic vehicles. For example, various embodiments may be used with rotorcraft or winged robotic vehicles, water-borne robotic vehicles, and space-based robotic vehicles. For ease of description and illustration, some detailed aspects of the robotic device 605 are omitted such as wiring, frame structure interconnects, or other features. While the illustrated robotic device 605 includes one or more wheels 602, this is merely exemplary and various embodiments may include any variety of components to provide propulsion and maneuvering capabilities, such as treads, paddles, skids, or any combination thereof or of other components.

The I/O controller 615 may manage input and output signals for the robotic device 605. The I/O controller 615 may also manage peripherals not integrated into the robotic device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the robotic device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the robotic device 605 may include a single antenna 625. However, in some cases the robotic device 605 may have more than one antenna 625, which may be capable of concurrently transmitting or receiving multiple wireless transmissions. For example, the robotic device 605 may wirelessly communicate with access point 110 and/or base station 105 via the antenna 625, or another computing device (e.g., a beacon, a smartphone, a tablet).

The memory 630 may include RAM and ROM. The memory 630 may store computer-readable, computer-executable code 635 including instructions that, when executed, cause the processor to perform various functions described herein. In some cases, the memory 630 may contain, among other things, a BIOS which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the robotic device 605 to perform various functions (e.g., functions or tasks supporting autonomous self-service such as debris collection).

The autonomous manager 610 may be coupled to the processor 640 and/or the navigation unit 645, and may be configured to identify a status of a chamber associated with the robotic device 605 based on sensor data received from one or more sensors 655 of the robotic device 605, and pause an autonomous debris collection process of the robotic device 605 based on the identified status. The autonomous manager 610 may resume the autonomous debris collection process based on an introduction of a second container, automatically remove a first container from the chamber based on the identified status, and discard the first container away from the robotic device 605.

The maneuvering data unit 650 may be coupled to the processor 640 and/or the navigation unit 645, and may be configured to provide travel control-related information such as orientation, attitude, speed, heading, and similar information that the navigation unit 645 may use for navigation purposes, such as dead reckoning between Global Navigation Satellite System (GNSS).

The drivetrain unit 665 may be coupled to the processor 640, the navigation unit 645 and/or the maneuvering data unit 650, and may be configured to maneuver the robotic device 605 by controlling individual motors driving the wheels 602 as the robotic device 605 progresses toward a destination. The drivetrain unit 665 may receive from the processor 640 data related to the navigation unit 645 and use such data in order to determine the present position and orientation of the robotic device 605, as well as the appropriate course towards the destination (e.g., drop-off zone) or intermediate sites. In various embodiments, the navigation unit 645 may include a GNSS receiver system (e.g., a GPS receiver) enabling the drivetrain unit 665 to navigate the robotic device 605 using GNSS signals. Alternatively or in addition, the navigation unit 645 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, robotic vehicles, etc.

The code 635 may include instructions to implement aspects of the present disclosure, including instructions to support autonomous self-service. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

The sensor 655 may be one or more sensors configured to conduct periodic or ongoing automatic measurements related to autonomous functions. A single sensor 655 may be capable of sensing multiple parameters (e.g., weight, airflow pressure, GPS), or alternatively, separate sensors may monitor separate resource parameters. For example, one sensor 655 may measure temperature, while another sensor 655 (or, in some cases, the same sensor 655) may determine orientation. In some cases, one or more sensors 655 may additionally monitor alternate sensor parameters, such as audio, vibrations, and the like.

In some examples, the sensor 655 be an example of an inertial measurement unit (IMU) or a similar sensor (e.g., accelerometer, a gyroscope, etc.). The processor 640 may receive additional information from one or more sensors 655 (e.g., an optical sensor, a pneumatic sensor that may sense reduced airflow or suction, a camera sensor that may be a monocular camera) and/or other sensors. In some examples, the sensor(s) 655 may include one or more optical sensors capable of detecting infrared, ultraviolet, and/or other wavelengths of light. The sensor(s) 655 may also include at least one sensor that provides motion feedback to the processor 640, for example, a wheel sensor (e.g., one or more wheel/rotary encoders), a contact or pressure sensor configured to provide a signal indicating contact with a surface, etc. The sensor(s) 655 may also include one or more of a radio frequency (RF) sensor, a barometer, a sonar emitter/detector, a radar emitter/detector, a microphone or another acoustic sensor, or another sensor that may provide information usable by the processor 640 for movement operations as well as navigation and positioning calculations.

In some examples, the sensor 655 may be an airflow pressure sensor or a weight sensor. In the example that the sensor 655 is an airflow sensor, the sensor 655 may obtain and forward sensor measurements to the processor 640. The processor 640 may determine whether an airflow pressure associated with an autonomous debris collection process is below a threshold based on the sensor measurements. If the airflow pressure is below the threshold, the processor 640 may pause the autonomous debris collection process and signal to the payload securing unit 660 to automatically remove a container from a chamber of the robotic device 605 housing the container. The payload securing unit 660 may remove and discard the container away from the robotic device 605, and insert a new container into the chamber. The payload securing unit 660 may signal to the processor 640 a control signal indicating that the container has been discarded and a new container has been inserted, and the processor 640 may resume the autonomous debris collection process thereupon. The payload securing unit 660 may alternatively remove and discard contents (e.g., debris, grass clippings) within the container away from the robotic device 605, without discarding the container.

In the example that the sensor 655 is a weight sensor, the sensor 655 may obtain and forward sensor measurements of a container, associated with a debris collection process, to the processor 640. The processor 640 may determine whether a weight of the container is above a threshold based on the sensor measurements. If the weight of the container is above the threshold, the processor 640 may pause the autonomous debris collection process and signal to the payload securing unit 660 to automatically remove the container from a chamber of the robotic device 605 housing the container. The payload securing unit 660 may remove and discard the container away from the robotic device 605, and insert a new container into the chamber. The payload securing unit 660 may signal to the processor 640 a control signal indicating that the container has been discarded and a new container has been inserted, and the processor 640 may resume the autonomous debris collection process subsequently.

Figure 7:
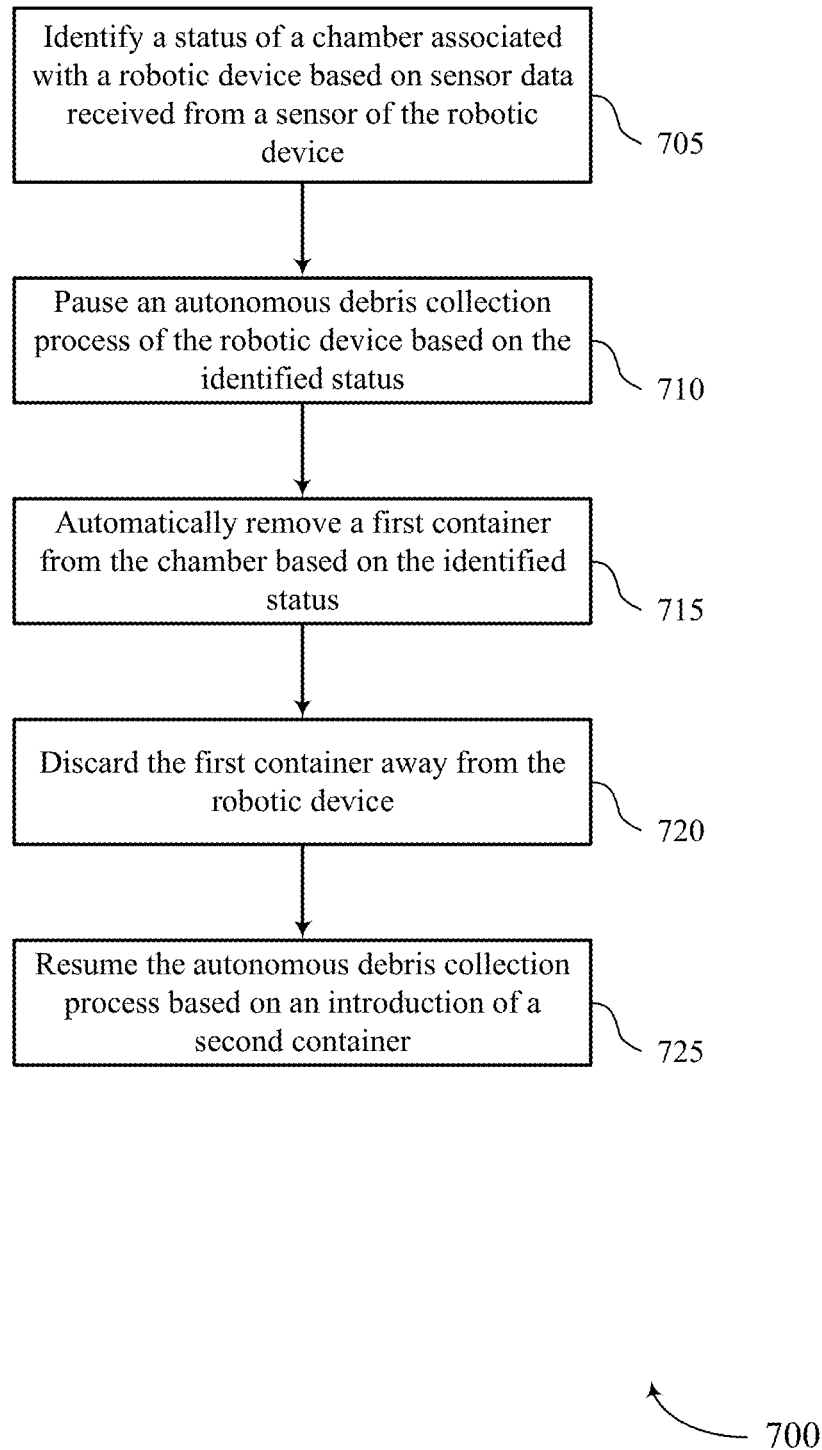
FIGS. 7 through 9 show flowcharts illustrating methods that support a robotic device performing autonomous self-service in accordance with aspects of the present disclosure.

FIG. 7 shows a flowchart illustrating a method 700 that supports a robotic device performing autonomous self-service in accordance with aspects of the present disclosure. The operations of method 700 may be implemented by a robotic device or its components as described herein. For example, the operations of method 700 may be performed by an autonomous manager as described with reference to FIGS. 4 to 6. In some examples, a robotic device may execute a set of instructions to control the functional elements of the robotic device to perform the functions described below. Additionally or alternatively, a robotic device may perform aspects of the functions described below using special-purpose hardware.

At 705, the robotic device may identify a status of a chamber associated with the robotic device based on sensor data received from a sensor of the robotic device. The operations of 705 may be performed according to the methods described herein. In some examples, aspects of the operations of 705 may be performed by a status component as described with reference to FIGS. 4 to 6.

At 710, the robotic device may pause an autonomous debris collection process of the robotic device based on the identified status. The operations of 710 may be performed according to the methods described herein. In some examples, aspects of the operations of 710 may be performed by an operations component as described with reference to FIGS. 4 to 6.

At 715, the robotic device may automatically remove a first container from the chamber based on the identified status. The operations of 715 may be performed according to the methods described herein. In some examples, aspects of the operations of 715 may be performed by a container component as described with reference to FIGS. 4 to 6.

At 720, the robotic device may discard the first container away from the robotic device. The operations of 720 may be performed according to the methods described herein. In some examples, aspects of the operations of 720 may be performed by a container component as described with reference to FIGS. 4 to 6.

At 725, the robotic device may resume the autonomous debris collection process based on an introduction of a second container. The operations of 725 may be performed according to the methods described herein. In some examples, aspects of the operations of 725 may be performed by an operations component as described with reference to FIGS. 4 to 6.

Figure 8:
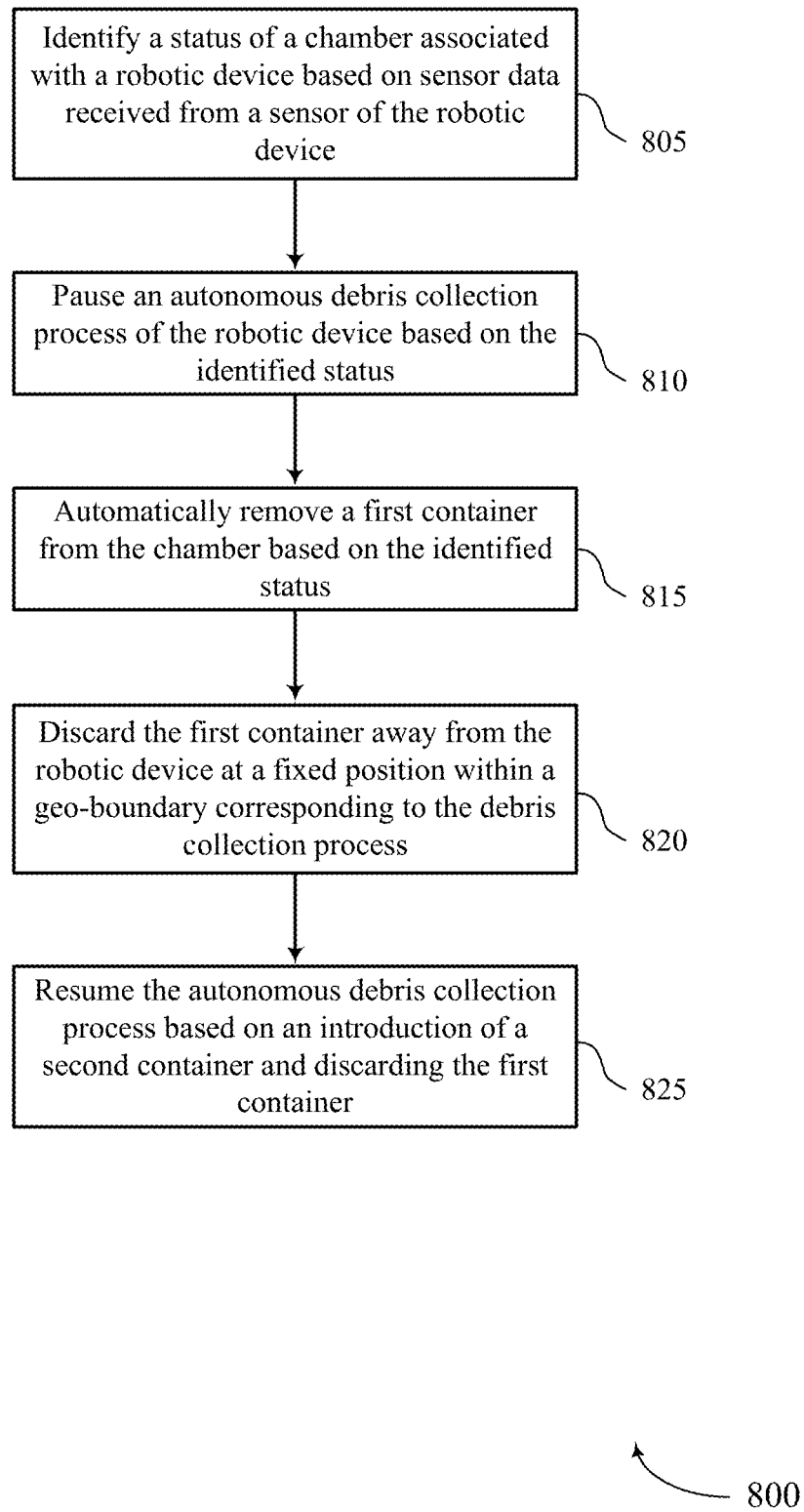

FIG. 8 shows a flowchart illustrating a method 800 that supports a robotic device performing autonomous self-service in accordance with aspects of the present disclosure. The operations of method 800 may be implemented by a robotic device or its components as described herein. For example, the operations of method 800 may be performed by an autonomous manager as described with reference to FIGS. 4 to 6. In some examples, a robotic device may execute a set of instructions to control the functional elements of the robotic device to perform the functions described below. Additionally or alternatively, a robotic device may perform aspects of the functions described below using special-purpose hardware.

At 805, the robotic device may identify a status of a chamber associated with the robotic device based on sensor data received from a sensor of the robotic device. The operations of 805 may be performed according to the methods described herein. In some examples, aspects of the operations of 805 may be performed by a status component as described with reference to FIGS. 4 to 6.

At 810, the robotic device may pause an autonomous debris collection process of the robotic device based on the identified status. The operations of 810 may be performed according to the methods described herein. In some examples, aspects of the operations of 810 may be performed by an operations component as described with reference to FIGS. 4 to 6.

At 815, the robotic device may automatically remove a first container from the chamber based on the identified status. The operations of 815 may be performed according to the methods described herein. In some examples, aspects of the operations of 815 may be performed by a container component as described with reference to FIGS. 4 to 6.

At 820, the robotic device may discard the first container away from the robotic device at a fixed position within a geo-boundary corresponding to the debris collection process. The operations of 820 may be performed according to the methods described herein. In some examples, aspects of the operations of 820 may be performed by a container component as described with reference to FIGS. 4 to 6.

At 825, the robotic device may resume the autonomous debris collection process based on an introduction of a second container and discarding the first container. The operations of 825 may be performed according to the methods described herein. In some examples, aspects of the operations of 825 may be performed by an operations component as described with reference to FIGS. 4 to 6.

Figure 9:
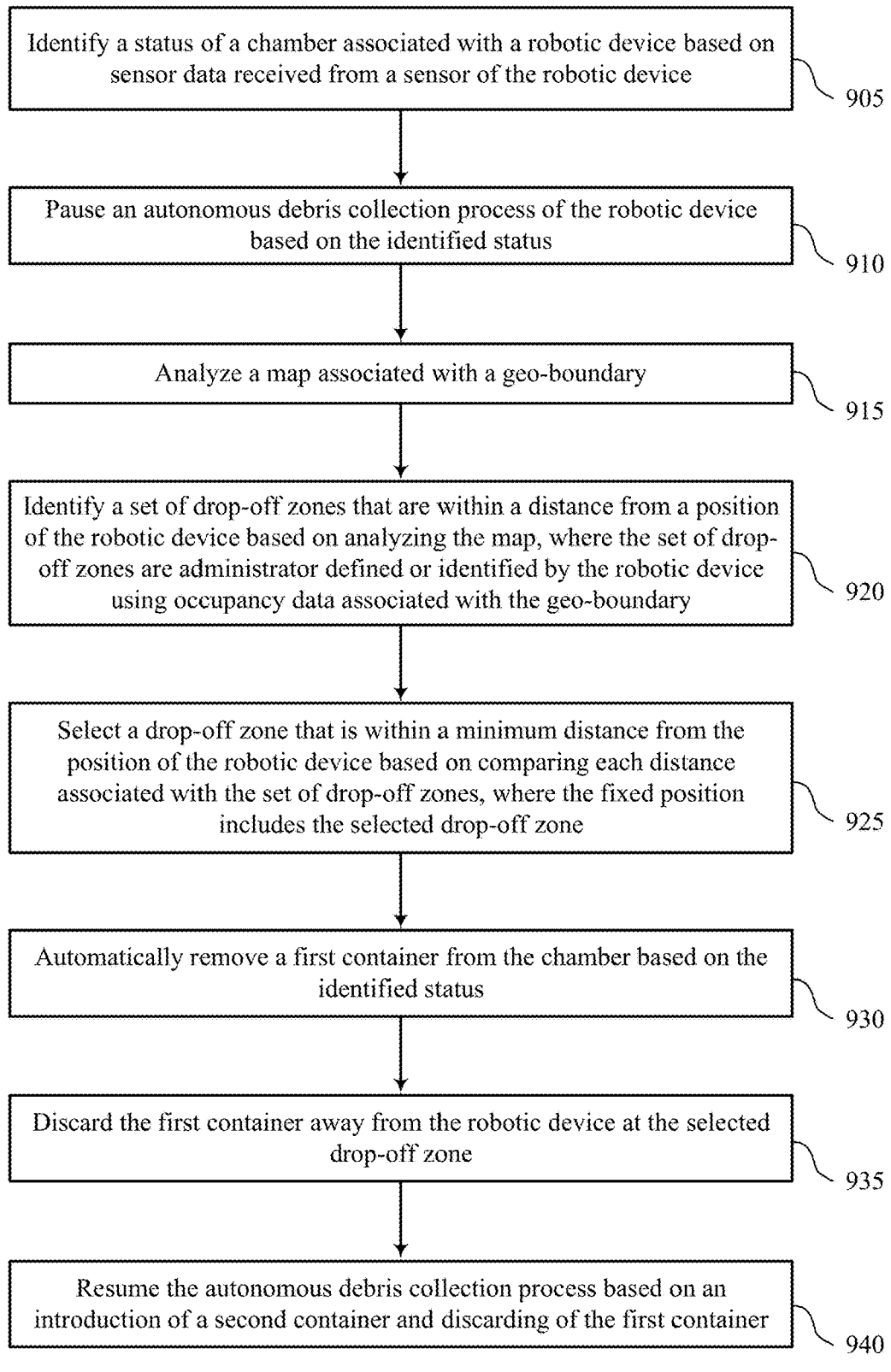

FIG. 9 shows a flowchart illustrating a method 900 that supports a robotic device performing autonomous self-service in accordance with aspects of the present disclosure. The operations of method 900 may be implemented by a robotic device or its components as described herein. For example, the operations of method 900 may be performed by an autonomous manager as described with reference to FIGS. 4 to 6. In some examples, a robotic device may execute a set of instructions to control the functional elements of the robotic device to perform the functions described below. Additionally or alternatively, a robotic device may perform aspects of the functions described below using special-purpose hardware.

At 905, the robotic device may identify a status of a chamber associated with the robotic device based on sensor data received from a sensor of the robotic device. The operations of 905 may be performed according to the methods described herein. In some examples, aspects of the operations of 905 may be performed by a status component as described with reference to FIGS. 4 to 6.

At 910, the robotic device may pause an autonomous debris collection process of the robotic device based on the identified status. The operations of 910 may be performed according to the methods described herein. In some examples, aspects of the operations of 910 may be performed by an operations component as described with reference to FIGS. 4 to 6.

At 915, the robotic device may analyze a map associated with a geo-boundary. The operations of 915 may be performed according to the methods described herein. In some examples, aspects of the operations of 915 may be performed by an analysis component as described with reference to FIGS. 4 to 6.

At 920, the robotic device may identify a set of drop-off zones that are within a distance from a position of the robotic device based on analyzing the map, where the set of drop-off zones are administrator defined or identified by the robotic device using occupancy data associated with the geo-boundary. The operations of 920 may be performed according to the methods described herein. In some examples, aspects of the operations of 920 may be performed by an analysis component as described with reference to FIGS. 4 to 6.

At 925, the robotic device may select a drop-off zone that is within a minimum distance from the position of the robotic device based on comparing each distance associated with the set of drop-off zones, where the fixed position includes the selected drop-off zone. The operations of 925 may be performed according to the methods described herein. In some examples, aspects of the operations of 925 may be performed by a selection component as described with reference to FIGS. 4 to 6.

At 930, the robotic device may automatically remove a first container from the chamber based on the identified status. The operations of 930 may be performed according to the methods described herein. In some examples, aspects of the operations of 930 may be performed by a container component as described with reference to FIGS. 4 to 6.

At 935, the robotic device may discard the first container away from the robotic device at the selected drop-off zone. The operations of 935 may be performed according to the methods described herein. In some examples, aspects of the operations of 935 may be performed by a container component as described with reference to FIGS. 4 to 6.

At 940, the robotic device may resume the autonomous debris collection process based on an introduction of a second container and discarding of the first container. The operations of 940 may be performed according to the methods described herein. In some examples, aspects of the operations of 940 may be performed by an operations component as described with reference to FIGS. 4 to 6.

It should be noted that the methods described above describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A robotic device, comprising:
   a processor;
   a memory in electronic communication with the processor;
   a sensor in electronic communication with the processor and the memory;
   a chamber configured to collect debris; and
   the processor configured to:
   identify a status of the chamber based at least in part on sensor data received from the sensor;
   pause an autonomous debris collection process of the robotic device based at least in part on the identified status;
   identify a drop-off zone based at least in part on occupancy data collected by the robotic device, wherein the occupancy data is associated with a geo-boundary;
   determine a path from the position of the robotic device to the identified drop-off zone based at least in part on a map associated with the geo-boundary;
   discard debris contained within the chamber away from the robotic device based at least in part on the identified drop-off zone; and
   resume the autonomous debris collection process based at least in part on the discarded debris.

2. The robotic device of claim 1, wherein the processor is further configured to:
   automatically remove a first container containing the debris from the chamber based at least in part on the identified status, wherein the instructions to discard the debris are further executable by the processor to cause the robotic device to:
   discard the first container from the chamber.

3. The robotic device of claim 2, wherein the processor configured to discard the first container from the chamber is further configured to:
   discard the first container at a fixed position within the geo-boundary corresponding to the autonomous debris collection process.

4. The robotic device of claim 2, wherein the processor configured to remove the first container from the chamber is further configured to:
   seal a portion of the first container.

5. The robotic device of claim 1, wherein the processor is further configured to:
   perform the autonomous debris collection process within the geo-boundary, wherein pausing the autonomous debris collection process further comprises:
   determine a position of the robotic device within the geo-boundary at a time of pausing the autonomous debris collection process; and
   record the position based at least in part on determining the position within the geo-boundary.

6. The robotic device of claim 5, wherein the processor configured to discard the debris is further configured to:
   analyze the map associated with the geo-boundary;
   identify a plurality of drop-off zones that are within a distance from the position of the robotic device based at least in part on analyzing the map, wherein the plurality of drop-off zones are identified by the robotic device using occupancy data associated with the geo-boundary; and
   select a drop-off zone from the plurality of drop-off zones that is within a minimum distance from the position of the robotic device based at least in part on comparing each distance associated with the plurality of drop-off zones.

7. The robotic device of claim 6, wherein the processor is further configured to:
   navigate to the selected drop-off zone based at least in part on the determined path.

8. The robotic device of claim 7, wherein the processor is further configured to:
   discard a first container containing the debris from the chamber at the selected drop-off zone;
   insert a second container within the chamber based at least in part on discarding the first container at the selected drop-off zone; and
   navigate to the recorded position based at least in part on inserting the second container,
   wherein resuming the autonomous debris collection process is after the robotic device arrives at the recorded position.

9. The robotic device of claim 8, wherein the processor configured to discard the first container from the chamber at the selected drop-off zone is further configured to:
   discard the first container from the chamber at a location adjacent to an access point of the selected drop-off zone.

10. The robotic device of claim 8, wherein the processor is further configured to:
generate a notification indicating that the first container has been discarded at the selected drop-off zone; and
transmit the notification to a wireless device associated with the robotic device.

11. The robotic device of claim 1, wherein the processor configured to identify the status of the chamber is further configured to:
obtain sensor measurements from the sensor;
determine a weight of the chamber based at least in part on the sensor measurements,
wherein the status of the chamber is further based at least in part on the weight of the chamber.

12. The robotic device of claim 1, wherein the processor configured to identify the status of the chamber is further configured to:
obtain sensor measurements from the sensor;
determine whether an airflow pressure associated with the autonomous debris collection process is below a threshold based at least in part on the sensor measurements,
wherein the status of the chamber is further based at least in part on the airflow pressure.

13. A method, comprising:
identifying a status of a chamber associated with a robotic device based at least in part on sensor data received from a sensor of the robotic device;
pausing an autonomous debris collection process of the robotic device based at least in part on the identified status;
identifying a drop-off zone based at least in part on occupancy data collected by the robotic device, wherein the occupancy data is associated with a geo-boundary;
determining a path from the position of the robotic device based at least in part on a map associated with the geo-boundary;
discarding debris contained within the chamber away from the robotic device based at least in part on the determined path; and
resuming the autonomous debris collection process based at least in part on the discarded debris.

14. The method of claim 13, further comprising:
automatically removing a first container containing the debris from the chamber based at least in part on the identified status, wherein discarding the debris further comprises:
discarding the first container from the chamber.

15. The method of claim 13, further comprising:
performing the autonomous debris collection process within the geo-boundary, wherein pausing the autonomous debris collection process further comprises:
determining a position of the robotic device within the geo-boundary at a time of pausing the autonomous debris collection process; and
recording the position based at least in part on determining the position within the geo-boundary.

16. The method of claim 15, wherein discarding the debris further comprises:
analyzing the map associated with the geo-boundary;
identifying a plurality of drop-off zones that are within a distance from the position of the robotic device based at least in part on analyzing the map, wherein the plurality of drop-off zones are identified by the robotic device using occupancy data associated with the geo-boundary;
selecting a drop-off zone from the plurality of drop-off zones that is within a minimum distance from the position of the robotic device based at least in part on comparing each distance associated with the plurality of drop-off zones; and
navigating to the selected drop-off zone based at least in part on the determined path.

17. The method of claim 16, further comprising:
discarding a first container containing the debris from the chamber at the selected drop-off zone;
inserting a second container within the chamber based at least in part on discarding the first container at the selected drop-off zone; and
navigating to the recorded position based at least in part on inserting the second container,
wherein resuming the autonomous debris collection process is after the robotic device arrives at the recorded position.

18. The method of claim 17, wherein discarding the first container from the chamber at the selected drop-off zone further comprises:
discarding the first container from the chamber at a location adjacent to an access point of the selected drop-off zone.

19. The method of claim 17, further comprising:
generating a notification indicating that the first container has been discarded at the selected drop-off zone; and
transmitting the notification to a wireless device associated with the robotic device.

20. An apparatus, comprising:
means for identifying a status of a chamber associated with the apparatus based at least in part on sensor data received from a sensor;
means for pausing an autonomous debris collection process of the apparatus based at least in part on the identified status;
means for identifying a drop-off zone based at least in part on occupancy data collected by the robotic device, wherein the occupancy data is associated with a geo-boundary;
means for determining a path from the position of the robotic device based at least in part on a map associated with the geo-boundary;
means for discarding debris contained within the chamber away from the robotic device based at least in part on the determined path; and
means for resuming the autonomous debris collection process based at least in part on the discarded debris.

* * * * *